(12) United States Patent
Raboin

(10) Patent No.: US 8,713,187 B2
(45) Date of Patent: Apr. 29, 2014

(54) MOBILE INTERACTIVE KIOSK METHOD

(75) Inventor: James P. Raboin, Brainerd, MN (US)

(73) Assignee: Manna LLC, Brainerd, MN (US)

( * ) Notice: Subject to any disclaimer, the term of this patent is extended or adjusted under 35 U.S.C. 154(b) by 308 days.

(21) Appl. No.: 12/927,420

(22) Filed: Nov. 15, 2010

(65) Prior Publication Data

US 2012/0124224 A1 May 17, 2012

(51) Int. Cl.
*G06F 7/04* (2006.01)

(52) U.S. Cl.
USPC ........... 709/228; 709/203; 709/226; 345/156; 345/169; 345/168; 345/173; 340/5.52; 340/5.82

(58) Field of Classification Search
USPC .................................. 709/228, 203, 226, 229
See application file for complete search history.

(56) References Cited

U.S. PATENT DOCUMENTS

| | | | |
|---|---|---|---|
| 6,906,696 B2 * | 6/2005 | Allport | 345/156 |
| 6,947,795 B2 * | 9/2005 | Bornhoft et al. | 607/60 |
| 2004/0155790 A1 * | 8/2004 | Tsuji | 340/825.21 |
| 2005/0124463 A1 * | 6/2005 | Yeo et al. | 482/8 |
| 2009/0041308 A1 * | 2/2009 | Chang et al. | 382/117 |
| 2009/0110131 A1 * | 4/2009 | Bornhoft et al. | 375/354 |
| 2010/0070860 A1 * | 3/2010 | Alkov et al. | 715/716 |
| 2011/0314082 A1 * | 12/2011 | Koneti et al. | 709/203 |

* cited by examiner

*Primary Examiner* — Jude Jean Gilles
(74) *Attorney, Agent, or Firm* — Billion & Armitage; Benjamin C. Armitage

(57) ABSTRACT

To regulate information exchanges, provide personal security and enhance personal privacy inside and outside a network and to regulate devices. Provided is a personal bio-data mining and pairing method of a human user to one or more communications devices capable of functioning in a network cloud environment and, where the rules governing cloud organization and communications are based in part upon a human user bio-data and real world information exchanges commonly occurring at specific geographical locations.

19 Claims, 10 Drawing Sheets

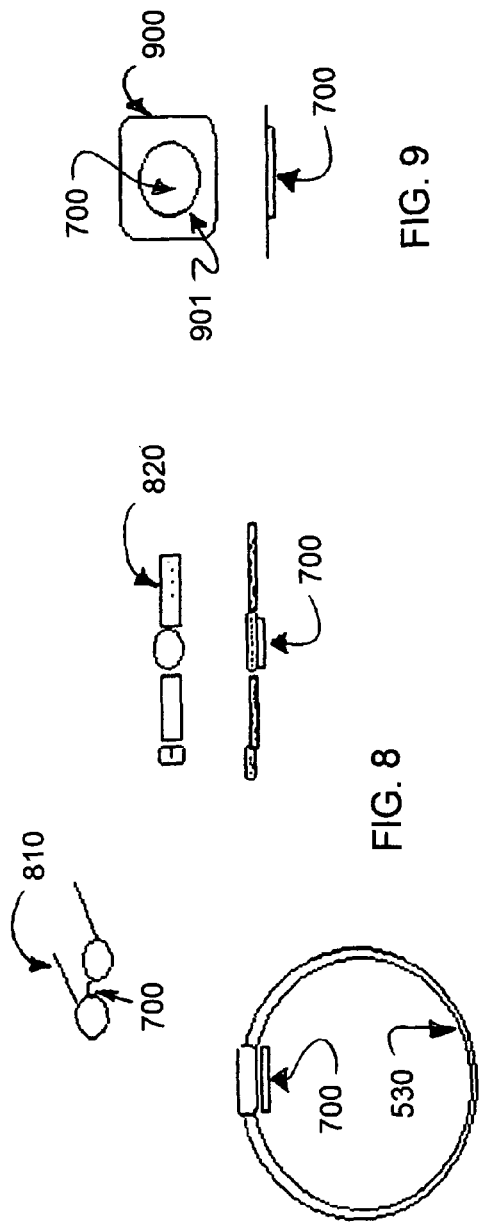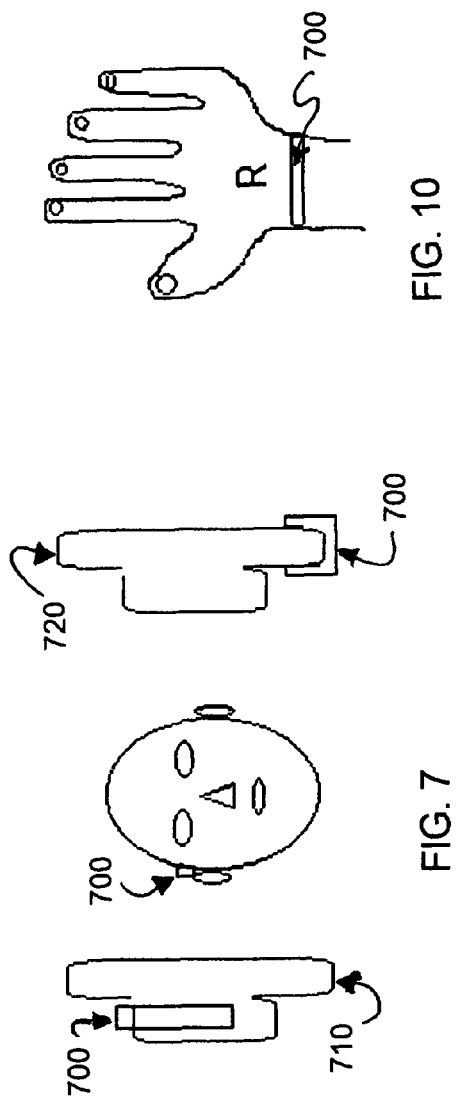

MOBILE INTERACTIVE KIOSK METHOD

FIELD OF THE INVENTION

This invention relates to a bio-mining method of a human user to facilitate pairing a human with one or more communications devices through bio-data collected from a communications device capable of external or internal contact with a user.

BACKGROUND OF THE INVENTION

Ever since communications devices (e.g., computers, cell phones and internet) were invented, there has been a need for a way to exchange information securely, in order to protect a user's personal information and corresponding communication devices, preventing identity theft and potential damage to software or hardware generated from malicious programs operating through those technologies. A central, safe and secure environment for exchanging personal information and for regulating one or more devices has been desired from the earliest days of the computer age.

Various components and systems currently exist that address portions of the present invention. There are kiosks as represented in patents like US 2005/0137942 and US 2007/0118437. There are cell phone sensor methods as represented in US 2009/0325539, cell phone location method as represented in US 2009/0219921 and a method for controlling cell phone operations through gestures as represented in US 2008/0014917. There are systems that use a human body as a communications medium as represented in U.S. Pat. Nos. 7,075,455 and 7,171,177 and 7,684,769 and 7,664,476. There are virtual server cloud interfaces as represented in U.S. Pat. No. 7,574,496 and there are internet browsers as represented in U.S. Pat. No. 7,277,912. Additionally there are energy harvesting methods as represented in U.S. Pat. Nos. 7,586,413 and 6,933,655. There are methods of storing occurrence data gathered by a distributed sensor network as represented in U.S. Pat. No. 7,536,388. And there are systems that detect human brain waves for purposes of regulating devices as represented in patent 2010/0010365.

But no invention exists that incorporates certain aspects of each one of the above cited patents in order to create an entirely new bio-data mining and human pairing technology capable of increasing individual personal security and information gathering capacity when communicating or transacting business in the real and virtual worlds.

Data mining typically relates to advanced data analysis in vast systems such as the Internet. The process seeks valuable information, trends, patterns, groupings and connections in order to provide tactical business advantages for business leaders. However, traditional data mining techniques do little for reorganizing the Internet, securing personal information and expanding mining techniques on a personal biological level. The solution for achieving these is found not in mining large systems but in mining data generated biologically from individual humans. A term now referred to as bio-data mining. This present invention proposes to transform a communications device, such as a cell phone, into a mobile interactive kiosk ("MISK") communications device and in so doing transform the Internet thereby opening the door to intercloud formation.

How would a MISK differ from a common cell phone today? Consider:

According to one aspect, your MISK may be reading your bio-information and/or bio-characteristics (bio-data). It may know what you sound like. It may be familiar with your own unique electric field. It may recognize your individual brain waves or the sound of your blood rushing through your veins. Your MISK may monitor body temperature and a host of other bio-data generated by you. In fact, it may even understand your brain waves and be able to accept communications from you telepathically through your mobile information cloud ("MIC") communications device.

Let's imagine you were walking in a crowd of people or on a sidewalk through a neighborhood, your MISK could be set to identify public information about an individual or a physical address. According to one aspect, a method of data processing could provide a means where you instantly see a proximity map showing sex offenders close to you.

Let's further imagine, according to another aspect, your MISK could be set to regulate what information originating from you could be made public, semi-public and which information was private.

Now let's take a trip to the Mall with your MISK on proximity mode. According to another aspect, other MISK owners who were proximate to your location could show up on your MISK as temporary cloud environments or bubbles. Other businesses operating a MISK device could have ability to use your MISK as an interactive kiosk showcasing their goods and services even before you enter the store.

According to another aspect, once inside, store advertisements could display on your MISK and you could see items that personally interest you. You could access further information on those items without asking a human for assistance. You could even find where an item was located in the store simply following a GPS styled display on your MISK. Your MISK could scan the item and pay for it right there in the aisle, safely and securely. No more check-out lines.

According to another aspect, a temporary cloud environment, or bubble, may be created between you and the store MISK system that is monitoring all its products stocked on shelves and recording the products you scan in. This temporary cloud may be uniquely encrypted preventing anyone other than you and the store access, so financial transactions in a temporary cloud environment are both private and secure.

According to another aspect, as you leave the store, a means of recording your purchases may be affirmed and the temporary cloud environment between you and the store may be dissolved. Any information exchanged within the temporary cloud may be deleted. In this way, your personal security could be maintained just as it would have been in a typical real world buying situation at that store location.

In our example let's say other MISK owners walk by. You see someone you should know but can't remember their name. According to another aspect, you could set your MISK device on proximity mode and see all bubbles and public information for every proximate MISK near you. You could see all public information from other MISK users who are willing to share with you. So your MISK device may function as a kind of a business card on steroids. Never again will you not be able to place a face with a name.

Let's say you go to your bank. Once proximate to the teller you hear her greet you by name. According to another aspect, your MISK bubble may be able to couple with other MISK systems, bigger bubbles, instantly bringing relevant information about your needs and past activities to the teller's fingertips. All your account information relevant to business dealings at that location may be accessible to the teller automatically as you step up to the counter because you are at the bank, inside their MISK bubble. No searching for files or entering queries. Your information is right there. On your MISK, at the same time, all relevant bank information may be displayed for you. Instant access and exchange of meaningful information may be automatically activated when you are proximate to a location or other MISK devices.

Now let's say you go to the shoe store. Once you reach the check-out station the teller again greets you by name. According to another aspect, the shoe store teller may only access information about you that would normally be exchanged within that store not using the MISK system. In other words, the shoe teller would only see your basic information and not be able to access information the bank next door was able to see. Why? Because doing so would violate real world information exchange practices. Personal security and privacy may be maintained in a MISK environment while personal convenience and information gathering capabilities may be enhanced.

Now let's imagine you go out to the parking lot but you notice your automobile keys are missing. No problem. According to another aspect, since you are paired with your MISK and have added all your possessions (that have a computer incorporated into their function) to a secure cloud environment through your MISK, nobody else may be able to access your stuff. Your car may not need a key because it will recognize you, and if you choose, only you. Through your MISK you become your key. Nobody will be able to operate your car in a MISK cloud environment accept those whom you allow to join the personal cloud that is housing your things.

How will a car know it is you? According to another aspect, your MISK may be reading your bio-information and/or bio-characteristics (bio-data). It may know what you sound like. It may be familiar with your own unique electric field. It may recognize your individual brain waves or the sound of your blood rushing through your veins. Your MISK may monitor body temperature and a host of other bio-data generated by you. In fact, it may even understand your brain waves and be able to accept communications from you telepathically through your mobile information cloud ("MIC") communications device.

How? According to another aspect, you may be training your MISK to recognize your brain waves through a series of controlled interactive information exchanges. Once your MISK identifies a particular brain wave associated with a particular thought or action of yours, it may store that wave and continually compare it with other waves collected from similar thoughts and actions. Once brain waves have been clearly identified and stored, they can be converted into commands readable to other devices.

According to another aspect, those signals may be amplified and transmitted to devices not in direct physical contact with you. So your telepathic communication capabilities may extend far beyond the weak brain wave field range generated in your body. This same training process could be used with any bio-information and/or bio-characteristics ("bio-data") which can be compared to your brain wave activity as a confirmation of your personal state of mind or intentions.

According to another aspect, your MIC could be monitoring blood flow noise and blood temperature. That information could be compared with recognizable brain waves and may help your MISK distinguish between normal user state of being from irregular user states of being such as drunkenness, sleep, fear, alarm, danger and distress.

According to another aspect, monitoring your bio-electric field through your MIC and MISK devices, and comparing it with controlled actions, could enhance and amplify your MISK's ability to recognize your brain activities. Data comparing your bio-capacitance and a host of other bio-data may all be useful to your MISK helping it to pair with you and ensuring nobody else will have access to your stuff through your MISK devices. Your MISK will be trained to recognize you and only you through your own unique bio-data.

Now let's begin the drive home. You want to listen to a talk show and your wife wants to listen to classical music. No problem. According to another aspect, your MISK can play music directly into your brain bypassing normal brain sound reception organs in your ears. You may be able to hear through your ears and hear inside your mind. Your MISK may record the frequencies currently being used inside your brain to discern sounds, visual images and any other human senses. Having identified these waves your MISK can broadcast signals in a form recognizable to your brain without going through your senses.

According to another aspect, your MISK may use frequencies that stimulate your skin which create signals going from your skin through your pituitary gland directly into your brain.

Or, according to another aspect, your MISK may use signal transmissions your brain can recognize and directly broadcast those signals into your brain for an instant and direct communications link inside your mind.

According to another aspect, if you are irritated by a strange sensation created by your MISK as it is communicating directly with your mind through your skin or nervous system, you can increase the wave transmission harmonically beyond your ability to physically feel MISK transmissions while maintaining physical stimulation on the pituitary, nervous system or brain. Doing so may allow direct communication between your mind and your MISK without experiencing negative physical sensations.

Now let's say your trip takes you into the night and all lighting to your gauges goes out from an electrical failure. You need to see your gauges and, according to another aspect, you may see your gauges displayed on your MISK or the images displayed directly into your mind.

As you continue along you hit a deer that causes you to go off the road and slam into a tree. Let's imagine all vehicle occupants are rendered unconscious and remain so as an ambulance arrives. Let's say there is no information recognizable onboard. According to another aspect, the medic, if he is a MISK user, need only to place his hand on your body and your MISK may automatically transmit all your medical information through your body, through his body, to his MISK device where your information may be displayed in human readable form.

After healing up you leave the hospital and a thief tells you at gunpoint to hand over your car keys, credit cards and, since you are a Texas resident, he takes your concealed gun you keep in the glove box. According to another aspect, they don't work. Your car, credit cards and your gun will not function for the thief because they are all part of a secure cloud environment through your MISK that ties them directly to your bio-data.

So he tells you to get in and drive him to a destination he will show you. According to another aspect, your MISK may pick up and compare your normal brain waves and other bio-data and instantly know something is wrong. Or it may optically detect your face configuration or other body gestures and discern conditions are not normal. Therefore your MISK may lock down your possessions and make an emergency call to the police. Your MISK may have collected the thief's bio-information and relayed it to the proper authorities. This will be the last theft attempt he makes for a long time.

You've had a busy day and decide to tell all yours friend at the coffee shop. According to another aspect, you sit down and begin communicating with your friends in a permanent cloud environment you established earlier. None of the dirtier aspects of the Internet may function inside your cloud community. If anybody tries to introduce internet filth in your cloud environment, your MISK may evict, brand and notify other MISK user's of that individual's location and past behaviors. It may become part of the global MISK environment public record within the entirety of the MISK cloud community.

Full transparency and full security may be the watchwords of a MISK environment. This is not to be confused with full information accessibility. According to another aspect, information accessibility may be set in part by MISK governing rules located within the MISK cloud browser program. Other parameters may be added by each individual MISK user and applied to their own private cloud environments.

For example, let's say we are still at the coffee shop telling everybody we know who is part of your permanent cloud community. According to another aspect, we may even tweet the entire cloud community through a message system that is part of the MISK cloud browser program where messages may be classified and organized by topic, geography and date. At the same time your MISK may ping everyone proximate to you at the coffee shop and invite them to share your experience in a separate but simultaneous temporary cloud environment automatically created between proximate MISK devices. Some people may accept the invitation, others do not.

According to another aspect, those people who do not even wish to be pinged like this may set their MISK to accept such invitations only from people who are within one foot or less of them. Such people may not show up on your MISK or that temporary cloud environment unless, when you walk by them on the way out the door, you get within one foot or physically touch them.

Let's say 10 other people join you in a temporary cloud environment and exchange stories and information. According to another aspect, once you leave the coffee shop, that temporary cloud which was set up in the coffee shop may automatically be dissolved from your MISK and any information exchanged therein may be deleted, both in your MISK and within the temporary cloud back in the coffee shop. Gone. If information and relationships found within a temporary cloud environment are to be preserved in your MISK, the temporary environment may be either joined to an existing permanent cloud within your overall cloud environment or you may create a new permanent cloud and store it on your MISK.

Now it get's interesting. Let's say a personal injury lawyer is within that temporary cloud environment you entered which was set up by the coffee shop's MISK system. He wishes to communicate with you further but you are yet unsure if you want to bring him into other permanent cloud environments in your MISK. At the same time, you do not want to discuss personal information within the existing temporary cloud bubble so, according to another aspect you change the mode between you two in the temporary cloud environment and begin exchanging information in a sub-bubble environment with complete secrecy. In other words, you set up a sub temporary cloud within the coffee shop's temporary cloud environment. After a few minutes you decide it is not a good fit.

According to another aspect, when you exit the coffee shop the temporary cloud pathway between you and the lawyer may be dissolved once either of you exceed a specific proximate distance limit you previously set for that temporary cloud experience. Or the secret exchange may be terminated by you or the lawyer before either of you leave the premises based upon hitting a disconnect button. Or let's say the temporary cloud parameter was time. You may set your MISK to exchange information for 5 minutes and then the secret back channel communications pathway may be dissolved with all information exchanged therein. You could host multiple secret back channel communications simultaneously with other MISK users and exchange differing levels of private data in each one.

According to another aspect, a function of a temporary cloud environment might be an inability to save information shared in that environment. So let's say you are in need of swapping research information on a limited scale with a competitor. You create a secret temporary cloud environment and begin discussing your idea. You incorporate video conferencing and share text information in that cloud environment. Upon any one party exiting the cloud session, all information stored therein may be dissolved.

According to another aspect, if the nature of your communications is really sensitive, you may exchange information verbally and/or visually via synthetic telepathic means. Or you may both meet at a coffee shop and discuss in person certain aspects through a traditional "over the table" conversation and then upon a handshake certain limited or secret information may be exchanged between parties using both human bodies as a medium between their respective MISK devices. This kind of information exchange prevents information from being pirated by other proximate communications devices. In this way physical gatherings can be a secure cloud environment just as easily as virtual gatherings can be.

According to another aspect, your MISK may store information that has been uniquely encrypted through a means comprising your own bio-data. Your MISK may send information directly into your body as a broadband signal which may be altered by your body capacitance and then passively detected by your personal MIC device that maintains physical contact with your body. And the MIC may transmit the altered signal back to your MISK for final data storage and analysis.

In this way all of your information may be stored in a completely individual configuration. Data stored on your MISK may be unlike data on anybody else's MISK around the world. Therefore your information may remain secret, safe and private. No viruses, malware or signal pirating may be effective because nobody will have the encryption key to unlock your information. As will information stored on all other MISKs be unreadable to you.

According to another aspect, back doors in your physical hardware may be completely ineffective as information retrieved may be in a form that is unreadable to any devices capable of accessing your information through that means.

In effect, according to another aspect, you and your bio-data may literally become the bio-password shield that functions as the gatekeeper over all your information and electronic devices. No longer will you have to remember your password. No longer will you have to continually change passwords on all your accounts in order to increase personal security. You need only have your MIC in physical contact with your body and your MISK handy to access information or regulate personal devices. Nobody and no computer will be able to crack your bio-password shield because your bio-data is too large, too complicated and continuously fluctuating based upon your individual naturally occurring bio-characteristics.

However, according to another aspect, as you participate in a temporary or permanent cloud environment, information you wish to share there may have the encryption shield removed in that environment. The MISK cloud environment itself may be encrypted through the bio-data from whoever created it so others who locate the cloud will not be able to see inside unless they are granted access and they enter the cloud environment. Once inside, certain information they choose to share may also have their encryption shield removed so information they make public can be readable to all other participants in that cloud environment. In this way, information can be exchanged in a meaningful, safe and secure way enhancing information synergy between MISK cloud participants while maintaining privacy between them at the same time.

According to another aspect, information shared within a MISK cloud environment can be in the form of photo, video, text, voice and other display means that may be discernable through human sensory organs and/or may be discernable directly to the brain bypassing human sensory organs.

According to another aspect, being paired to your MISK through your MIC may dramatically enhance your personal cloud experience. When participating in virtual gaming or when listening to music in a MISK cloud environment, you may have synthetic feelings added to those experiences beyond visual and auditory senses. You may feel things and smell things as information within the cloud may be set to directly communicate with your brain.

According to another aspect, movies can become truly interactive. Imagine watching a movie or playing a virtual game and gesturing to pick up a stick and a sensation in your hands feels just like you were holding it. Or imagine you are watching the World Series in a cloud environment and a home run is slammed into the crowd. You reach out your hand as if you had your glove on to catch the ball. Immediately there is a sensation in your hand of a glove being impacted by the ball. Or you smell hotdogs or popcorn.

According to another aspect, your MISK may be set to enhance all of your other media experiences. Imagine watching "The Sound of Music" when Maria is singing on the mountain tops. Or imagine questing through beautiful mountains and being able to smell the mountain flowers, grasses and fresh air while you participate with the media inside a MISK cloud. The list of possibilities is endless.

According to another aspect, your MISK could function as your universal remote. You could create a cloud environment for all your devices that your MISK would then be able to regulate.

According to another aspect, you could be trained to work with your MISK and your MISK could be trained to recognize your bio-data through virtual games or real life occurrences.

According to another aspect, your personal MIC may consist of a transponder capable of sending and receiving information. It may further consist of a CPU, a storage means and an energy harvesting means. The energy harvester unit may reduce any battery size requirements for the MIC and provide a means to energize a battery incorporated into the device. The energy harvester antenna may further be used as a means to sense bio-data from its host when in physical contact with said host human.

According to another aspect, information collected by a MIC that is paired to a host human may be transmitted to another MISK not yet paired. The MISK may use host human bio-data generated in part from the host user's MIC that may be used for pairing the host human to an unpaired MISK device. The host user, MISK and MIC may all be connected and paired together using the host human bio-data as a kind of personal bio-password and a way for information to be encrypted.

According to another aspect, a recognizer unit may be incorporated into both a MISK and a MIC device which may have capacity for both devices to look for and identify their host human bio-data as well as recognize software and hardware identifier information that may be part of a MIC and a MISK device.

According to another aspect, pairing between a MIC and a human host and pairing between a MIC and corresponding MISK, and paring a MISK to a human host, can be established through information gathered, stored, shared and finally recognized by the recognizer unit which may be functioning as part of a MIC and a MISK device. In this way a, human can become an integral part of a MIC and a MISK device.

According to another aspect, the MIC device may be a gatekeeper of bio-data which can only be detected when MIC device is in physical contact with a host human. A MISK device may incorporate all or part of bio-data collected by a MIC which may be combined with bio-data collected by MISK that it was able to detect not being in physical contact with a host human. The MISK may also send and collect bio-data to and from a host human through other proximate communications devices.

According to another aspect, a MIC paired to a human host may have capabilities of sending and receiving one or more signal transmissions, which may consist of varying amplitudes and frequencies, to and from a MISK that is paired to the MIC device.

According to another aspect, a MIC may also have capabilities of sending and receiving one or more signal transmissions, which may consist of varying amplitudes and frequencies, to and from a human host.

According to another aspect, a MISK paired to a MIC and its human host may also have capabilities of sending and receiving one or more signal transmissions, which may consist of varying amplitudes and frequencies, to and from said human host.

According to another aspect, a second MISK paired to a second human host may have capabilities of sending and receiving one or more signal transmissions, which may consist of varying amplitudes and frequencies, to and from the first human and/or any MISK paired to the first human.

According to another aspect, a MISK paired to a human host may have capabilities of sending and receiving one or more signal transmissions, which may consist of varying amplitudes and frequencies, to and from other communication devices.

According to another aspect, both MIC and MISK devices may incorporate an energy harvesting unit that may supply at least part of the energy needs for the devices. Said energy harvester unit may convert electromagnetic waves such as microwaves, from proximate communication devices or other devices capable of generating electromagnetic transmissions. Or the energy harvesting unit in a MIC may convert heat as a thermal coupler and directly covert heat to electrical energy. Or a energy harvesting unit functioning as part of a MIC may comprise a piezoelectric means of harvesting electrical energy. Or an energy harvesting unit may incorporate one or more of these and other energy harvesting technologies to produce electrical energy for a MIC.

According to another aspect, a MIC device may incorporate a energy harvesting unit method to collect at least a portion of bio-data from host human. The energy harvesting unit may include a self powered switch capable of alternating antenna method of operation from a energy harvesting mode to a bio-data collection mode and/or a signal transmission mode intended to be received by a device inside or outside the host human's body. The energy harvesting unit may comprise at least one antenna.

According to another aspect, a method of detecting, establishing a communications pathway, exchanging information, and converting other communications devices into at least a partial MISK unit may be initiated once a MISK device is proximate to another communications device or is in any form of contact with a MISK device. A first communication exchange may take place in a secure temporary cloud environment localized between both devices. A further method may enable a MISK device to become master over a proximate communications device.

According to another aspect, a MISK device may send an invitation in human readable form that may display a method of accepting, downloading, and installing a MISK application onto a proximate communications device after being granted access to the temporary cloud environment.

According to another aspect, a MISK application may be capable of transforming a communications device into at least a partial MISK device.

According to another aspect, once transformation is complete, a method of changing relationship from a master/slave configuration to a peer to peer relationship may be established between the first MISK device and the newly transformed MISK device. As part of the transformation process, instructions may be provided indicating how a new MISK user can obtain a personal MIC device. Full access to the MISK cloud environment may not be accessible until the new host human is properly paired to a MIC device and at least one MISK device.

According to another aspect, a MISK cloud browser program may function inside the MISK cloud environment that is created inside a network. And the cloud browser program may function outside the MISK cloud environment inside a network.

According to another aspect, the MISK cloud browser may function in harmony as part of a existing internet browser program or as a standalone browser program operating within the internet.

However, according to another aspect, the MISK cloud browser program may be the only browser program capable of operating within the MISK cloud environment.

According to another aspect, the MISK cloud browser may allow you to visit other cloud environments within the MISK cloud environment. It may also allow you to visit internet sites outside the MISK cloud environment.

According to another aspect, a MISK cloud browser icon may be placed on your MISK desktop. Upon activating the MISK cloud browser icon, you may be given a choice between accessing information in the MISK cloud community or accessing information from the internet. Or your MISK cloud browser may simply indicate to you the source of information that is being displayed from a query.

According to another aspect, every web page or MISK cloud page may run through the MISK cloud browser program, this will provide the original owner of the MISK cloud browser technology ultimate control over the MISK cloud environment as its administrator.

According to another aspect, the MISK cloud environment may operate inside the internet and may transform the internet virally from the inside out. The result this transformation will be as dramatic as telephone communications were transformed by the Internet. Eventually all internet activity may reside within one huge MISK cloud environment which itself may contain a multitude of smaller clouds connected in various ways inside therein.

Why may the Internet be absorbed and transformed through the MISK cloud environment? People will want absolute security and privacy found exclusively within a MISK cloud environment. They may also want to experience the free flow of information within a MISK cloud community as well as experience an enhanced sensory communications method. The MISK cloud environment may expand virally from a MISK device to other communications devices until this technology completely absorbs the internet and every communications device able to connect with it or make a phone call. At the end of the day, it may be that only one MISK cloud browser may be running the bulk of Internet activity. Only one cloud browser will make the rules and governing cloud.

According to another aspect, a MISK cloud search method may function within the MISK cloud environment. It may seek other clouds or access a massive library bank within the MISK cloud environment that may be loaded with information unparalleled in the real world or virtual world.

According to another aspect, a method of ranking information content within the MISK cloud environment may be established preventing a human, who is too young, from accessing inappropriate material. The only way one can participate in a MISK cloud community will be by having a MIC device properly paired and in physical contact with a host human and both must also properly be paired to at least one MISK device, which then may serve as a portal to the MISK cloud community.

An example of public information which may be required to be accessible from each MISK user, as being part of the standard information exchanged within the MISK cloud community, may include individual MISK user name and age. So when a MISK user wants to access information within the MISK cloud community library, an individual's age may prevent them from seeing inappropriate material. Same goes for searching MISK clouds available within the MISK cloud community. If any clouds are participating in activities that are beyond appropriate discretionary levels for a particular age group, again the individual who is too young may be denied the ability to see or even request joining a particular cloud environment.

According to another aspect, individual MISK users can further impose information content controls preventing inappropriate material from being accessed or shared in their MISK experience. Privacy and secrecy may be maintained according to personal preferences. Just because material is out there may not automatically mean you want to have access to it. So a method of ranking MISK information and individual MISK clouds may be incorporated within the entire MISK cloud environment. Eventually all explicit internet activity may be effectively controlled and quarantined from public view within the entire MISK cloud community.

Basically, through the MISK and MIC cloud system, a method of recreating the web is provided. And the way we interact with each other and information in general may be revolutionized and upgraded. You, your MISK device, and your personal MIC device can serve as an interface between the real world and virtual world.

Let's imagine you are going to church. A church would be an example of a commercial entity. According to another aspect, you enter the foyer where there is a MISK that is paired to a church official who set up a permanent cloud environment for that location. Anybody who passes by the church MISK inside the building may automatically exchange information and be registered, logged and noted in the church records. At the same time the church MISK may pass announcements to your personal MISK so you are fully informed. In this way the church may be able to automatically create and maintain its church directory, track attendance, communicate messages and keep in touch with members without the hassle of continual, ongoing data entry.

According to another aspect, businesses can use the same technique to track their customers. Businesses would be another example of a commercial entity. Business managers may be able to track how customers respond to in-store advertising, aisle configuration, customer traffic patterns, or customer time spent in the store. Stores may generate a complete record of everyone who entered their store and may be able to create an ongoing record of what each customer typically purchases there.

Individualized messages can be created and tailored specifically to each customer buying habits. Messages can inform proximate customers of other products thereby enhancing cross selling efforts. Customers may be able to instantly communicate with customer service or other proximate MISK users anywhere in the store through a temporary or a permanent cloud environment the store sets up for each customer who enters the store. Communications between a customer and a store representative may be secure and private. Financial transactions can take place in complete privacy. Marketing campaigns can be changed instantly, results tracked, and instantly analyzed. In store digital screens may change what they display based upon who is proximate to the screens. Coupons could be displayed on a customer's MISK as could sale items.

Although the previous mentioned examples are rather specific, it nevertheless alludes to vast array of applications possible when a MIC device and a MISK device are paired to a human host. And, as will be apparent, the technology described herein is not limited to system configurations as described. Such aspects of the present technology are thus about powerful new human interfaces with communications devices that are paired to a human. These new user interfaces extend into the everyday world in ways that a cell phone, a computer or the internet never could.

The foregoing just touches upon a few of the many aspects of the technology detailed herein. These and other features of this present technology will be more readily apparent from the following detailed description, which proceeds with reference to the accompanying drawings.

SUMMARY TO THE INVENTION

In accordance with the present invention, there is provided a method for mining bio-data from a human user to be used in part to pair a user with a mobile interactive kiosk (MISK) communications device through a mobile information cloud (MIC) communications device capable of external or internal contact with a user, in order to regulate information exchanges, provide personal security, enhance personal privacy and to regulate devices within a network. This invention further relates to providing a user with an ability of creating, browsing, searching, categorizing, participating and passing information between one or more secure cloud environments through a cloud browser program operating within a network. And further relates to classifying information based in part upon user proximity to a specific location and collected user bio-data, applying that information as a partial basis for establishing guiding rules for governing communications within a cloud environment.

BRIEF DESCRIPTIONS OF THE DRAWINGS

FIGS. 7-10 shows MIC to human contact methods.

DETAILED DESCRIPTION OF THE PREFERRED EMBODIMENT

Figure 1:
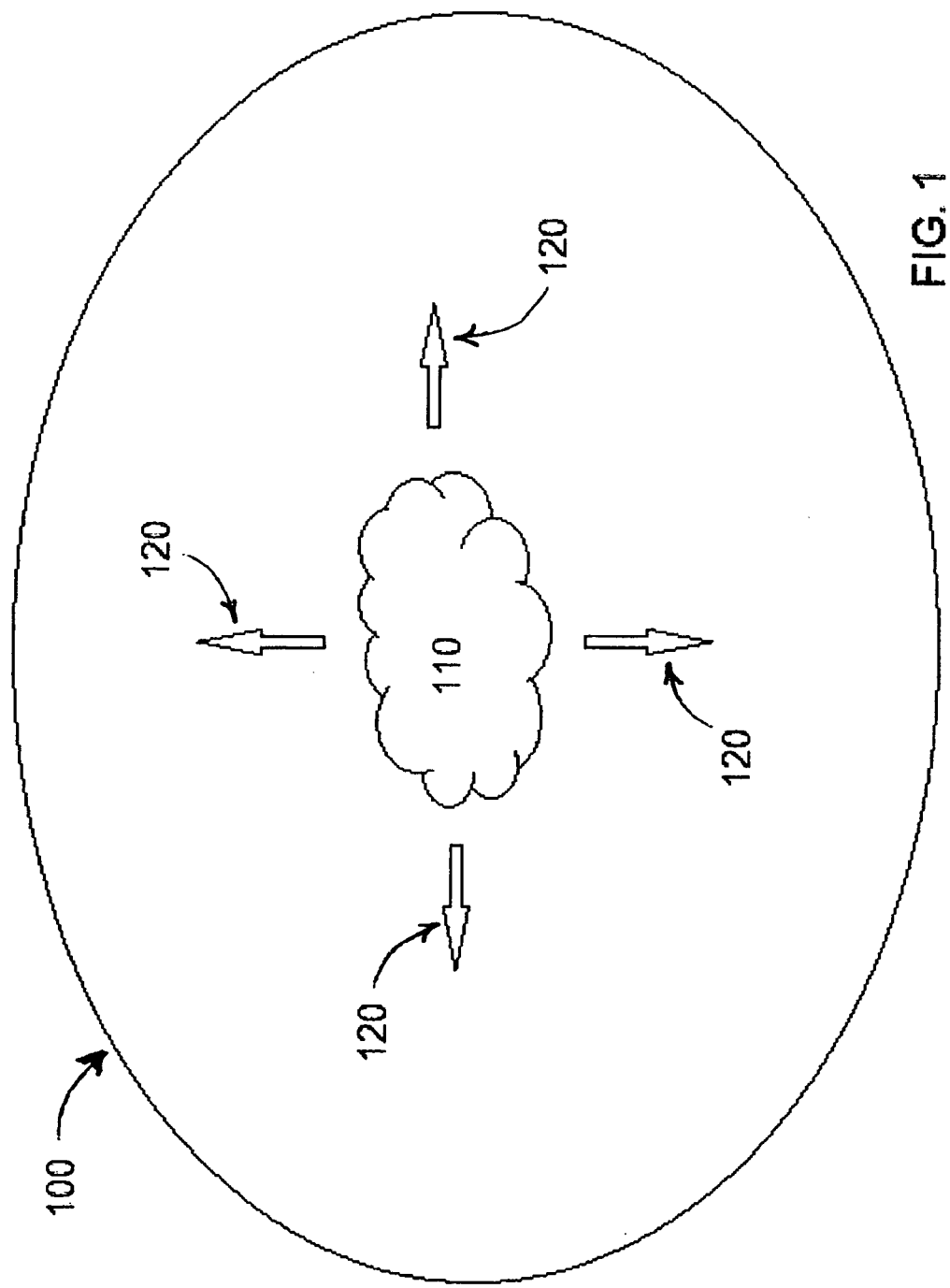
FIG. 1 is diagram illustrating a gated cloud community environment method operating within a network.

FIG. 1 is diagram illustrating method for a gated cloud community environment 110 operating within a network 100. A network is a communications link that could consist of one or more LANs ("Local Area Networks") and/or one or more WANs ("Wide Area Networks") and/or the Internet, the World Wide Web, analog or digital wired and wireless telephone networks (e.g. PSTN, ISDN, or xDSL), radio, television, cable, satellite, and/or any other delivery mechanism for carrying data. The gated cloud environment 110 expands into and transforms a network 100 virally from the inside out as other communication systems capable of delivering and exchanging data through a communications link.

Figure 2:
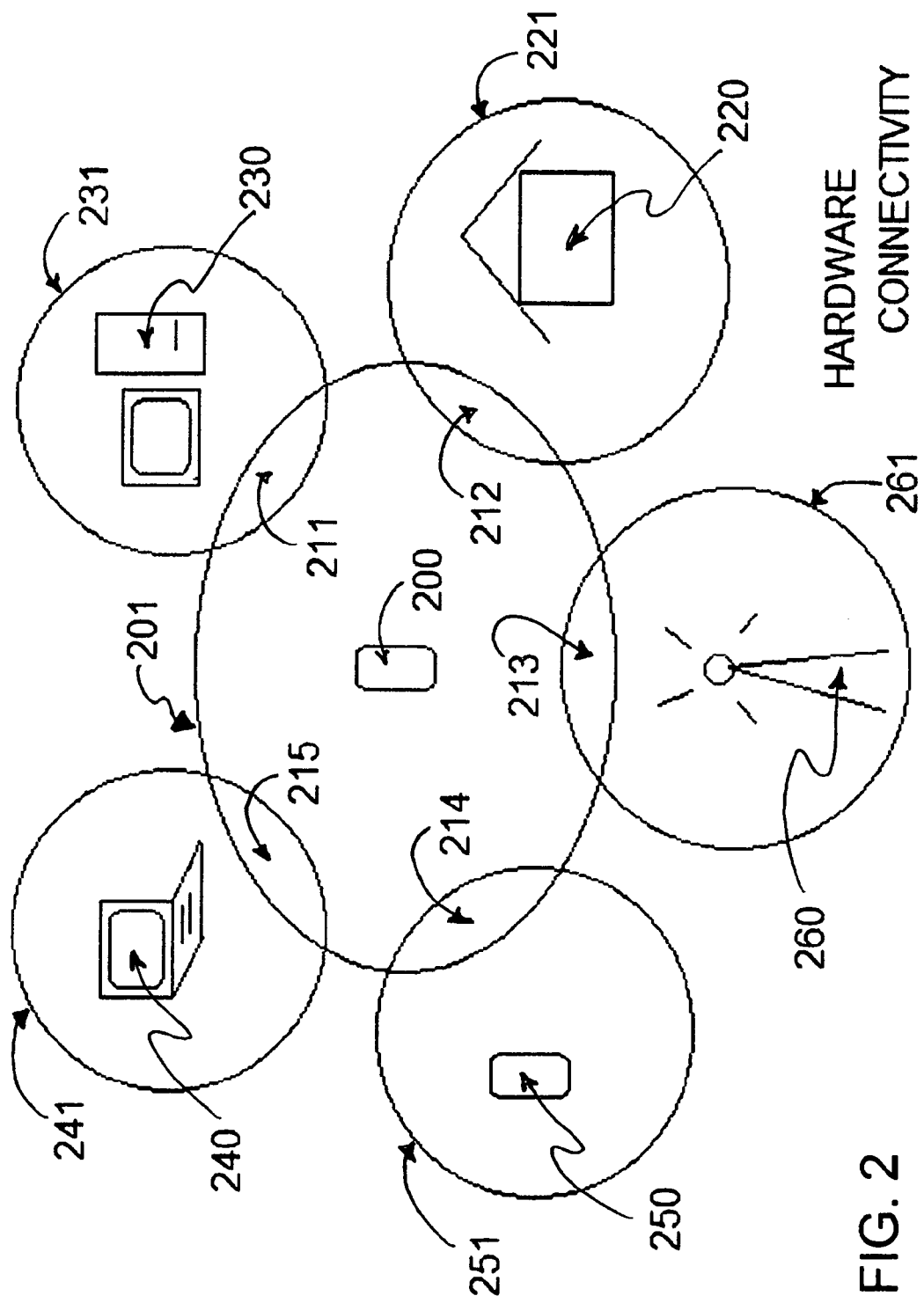
FIG. 2 is a diagram illustrating how the present invention connects with other communication devices in a cloud configuration.

FIG. 2 is a diagram illustrating a hardware connectivity method for a mobile interactive kiosk device 200 to interface with one or more other communication devices through a wired or wireless communications data pathway at 211, 212, 213, 214, and 215. A cloud environment is established when a MISK device 200 is proximate to or within communications range with other communications devices that are capable of executing instructions under the command of MISK device 200. FIG. 2 shows a portable computer 240, a standalone computer 230, a cell phone 250, a LAN network 220, or a WAN network 261 all having a broadcasting range that can intersect MISK device 200 at 201. Where 201 is the proximate broadcasting range for MISK 200 and the proximate range is 241 for a portable computer 240, and the proximate range is 231 for a standalone computer 230, and the range is 221 for an intranet network 220, and the proximate range is 261 for a WAN broadcasting unit 260. Detection between the communications devices occurs at 211, 212, 213, 214 and 215 respectively which provide an opportunity for a temporary or permanent communications link between the devices.

Figure 3:
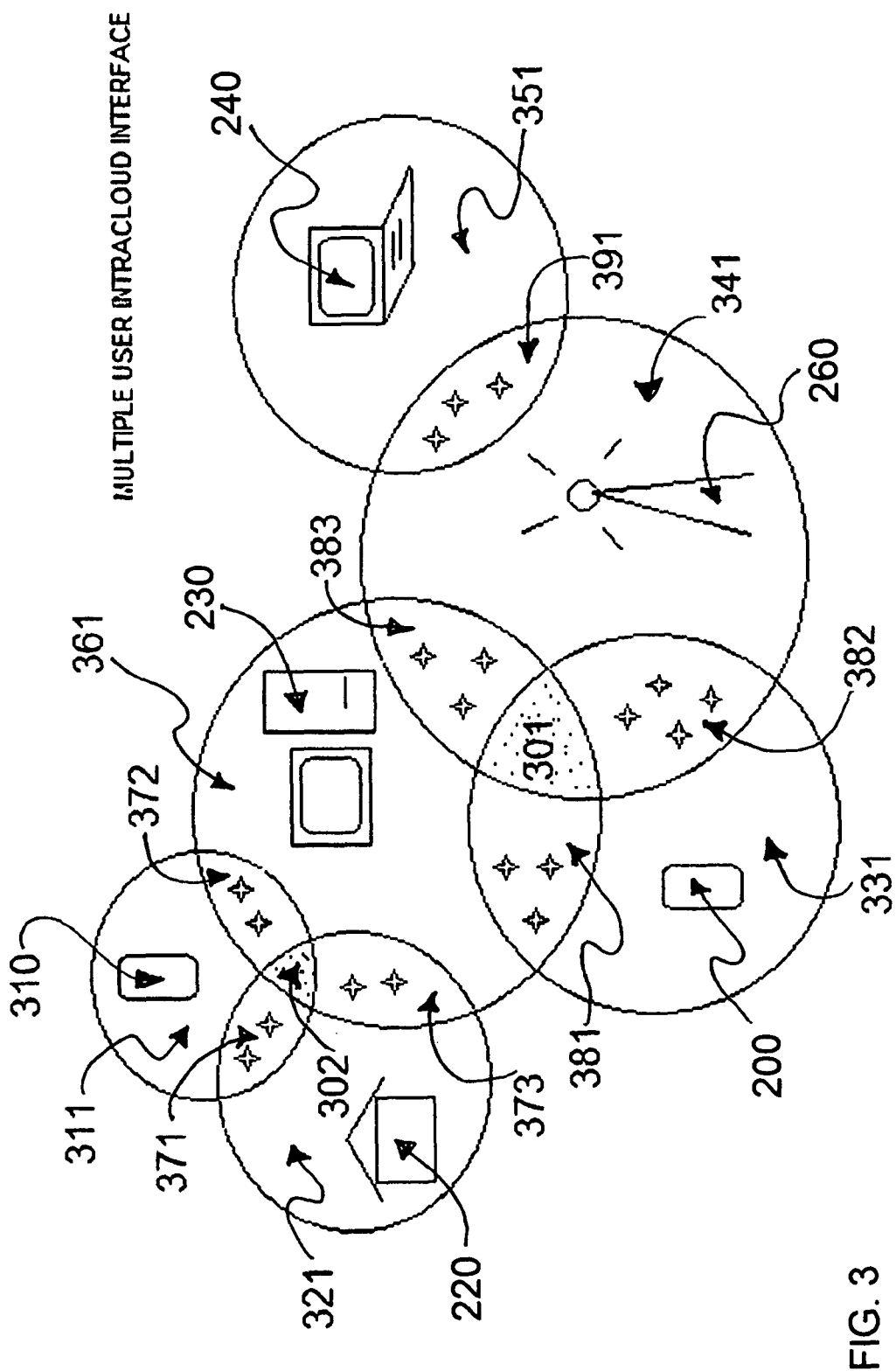
FIG. 3 is an illustration of an intracloud method showing interfaces between multiple proximate communications devices.

FIG. 3 is an illustration of an intracloud method showing interfaces between multiple proximate communications devices. MISK user 200, is connected to the internet through a WAN network 260. Both communications systems intersect and exchange information through communication pathway 382. MISK user 200 is simultaneously proximate with a standalone computer 230 that will be located within a store, having a communications pathway and intersection point 381, through which information can be exchanged. Standalone computer 230 is also connected to the internet through a WAN communications pathway 383, providing a further common communications link 301 between MISK 200, computer 230 and the WAN network 260.

Computer 230 is simultaneously proximate with an LAN (in-store) network 220, with broadcast range of 321, producing a common communication link at 302. Computer 230 is within proximate range 311, of a cell phone 310, which creates a a communication pathway 372, between them. A common communications link 302 is established between computer 230, the in-store network 220, and the cell phone 310.

Portable computer device 240 is out of communication range 351 from the other devices but is connected to the WAN internet communication pathway through intersection 391.

MISK device 200 pings communication device 230 establishing a communications pathway which allows an information exchange between devices. MISK 200 forms a master/slave relationship over device 230 and implements a method of converting device 230 into a MISK.

Once device 230 has completed its transformation into a MISK, relationship between MISK 200 and newly transformed MISK 230 is changed into a peer to peer relationship. New MISK 230 displays in human readable form information on how its user can pair with it and how to obtain a personal mobile information cloud (MIC) device. Once MISK 230 successfully pairs with its host human user through a MIC device, then MISK 230 will ping devices 220 and 310 virally transmitting the conversion process.

In our coffee shop example a secret communications method was offered. If you were the owner of a MISK device 200, at the coffee shop, and all other communications devices were MISKs in FIG. 3, a temporary cloud environment would be established at 301 between MISK devices 200, 230 and 260. In cloud 301 all three parties could exchange information freely. If MISK user 200 wanted to exchange private information with MISK user 230 in secret away from participants in temporary cloud 301, he would create through the MISK device 200 a sub temporary cloud environment 381 where MISK user 200 and MISK user 230 could exchange information either separately or simultaneously to the cloud exchange occurring at 301.

Figure 4:
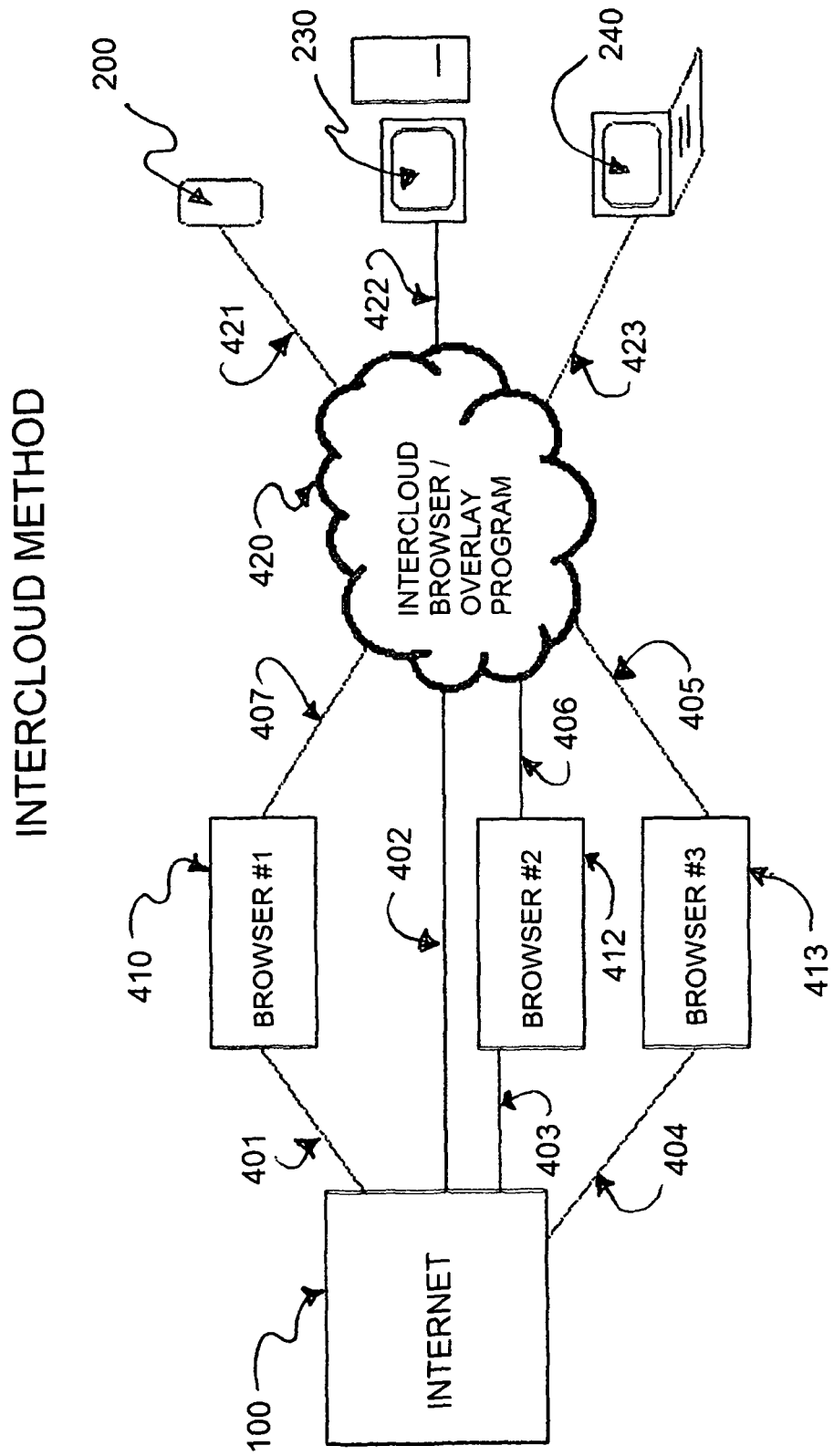
FIG. 4 is a diagram illustrating an intercloud method operating within a network.

FIG. 4 is a diagram illustrating a communications method 420, operating within a network 100, that can function directly as a network browser through one or more communications pathways 402. A browser is a software application allowing users to view and access electronic content stored either remotely or locally. A browser is commonly used to display documents in Hyper-Text Markup Language ("HTML") and stored on servers connected to a network like the Internet 100.

The communication system in FIG. 4 is capable of delivering and exchanging data between a MISK device 200 and a host system 230 through a communications link 421 to an intercloud browser program 420. MISK user 200 may own a general purpose computer such as a laptop computer 240 that also is functioning as a MISK device having a communications link 423 to the intercloud browser program 420 originating from a host system 230 through a communications pathway 422. Examples of each element herein are broadly described and may each include numerous interconnected computers and communications devices not represented in the diagram.

The intercloud browser program 420 ("MISK application") is a software application originally loaded onto the host system 230 for commanding and directing communications enabled by the host system. Example of such commands may include creating intracloud temporary and permanent cloud environments. Commands may include a system of organizing cloud environments in a searchable configuration. Commands may include a method of dissolving and deleting intracloud environments.

Commands may further incorporate human generated bio-passwords to be used in establishing a secure gated cloud community environment. The MISK application 420 capable of commanding and directing may include a computer system, a device, an instruction, a piece of code, a program, or a combination thereof for collectively or independently instructing the host system 230. MISK application 420 may be temporarily or permanently embodied in any type of equipment, component, machine, storage medium, or signal propagation method capable of carrying instructions to the host system 230.

The MISK device 200 is capable of communicating with other proximate communications devices 240 through the MISK application 420 via communications pathway 421 and 423 respectively. MISK device 200 can further access the Internet 100 through MISK application 420 directly via communications pathways 421 and 402 respectively. Or MISK device 200 can access the Internet 100 through an existing browser application previously loaded on the MISK device 200 operating system.

In an example, let's say Browser #1 410 is a Microsoft Internet Explorer browser application. MISK device 200 initiates MISK browser 420 through communications pathway 421. MISK browser 420 accesses Browser #1 407 through communications pathway 407. Browser #1 410 then accesses the Internet via communications pathway 401. Browser #2 412 might be Google's Chrome and Browser #3 413 might be Apple's Safari. A MISK device 200 or 240 will have capability of accessing information from Internet 100 directly through communication pathway 402 or through any browser currently operable on their operating system.

The host system 230 either functions as a login server or is capable of establishing a communications link with one thereby enabling access by subscribers and/or users that will route communications and other elements between a MISK device 200 and the host system 230. The host system 230 also includes various password, encryption, pairing methods and communications methods related to a human bio-data from a human owner of host system 230 and bio-data from at least one human user of a MISK device 200 and/or 240.

The MISK application 420 supports communication methods like instant messaging, texting, emailing, video transmissions, audio transmissions and other transmissions that may be discerned by human sensory organs and/or discerned directly into at least one human brain bypassing human sensory organs.

The MISK application 420 further includes a method where rules governing cloud communications are based in part upon a human user bio-data and real world information exchanges commonly occurring at specific geographical locations.

The MISK application 420 includes a method of pairing at least one human user to one or more communications devices.

The MISK application 420 includes a method of organizing information, regulating information exchanges, provide personal security and enhancing personal privacy inside and outside a network 100 and to regulate devices.

The MISK application may support associated services, such as administrative functions, advertising, interest groups and directory services as related to a cloud community having architecture that enables all communications devices to communicate with each other while being connected through the MISK application 420.

Figures 5, 6:
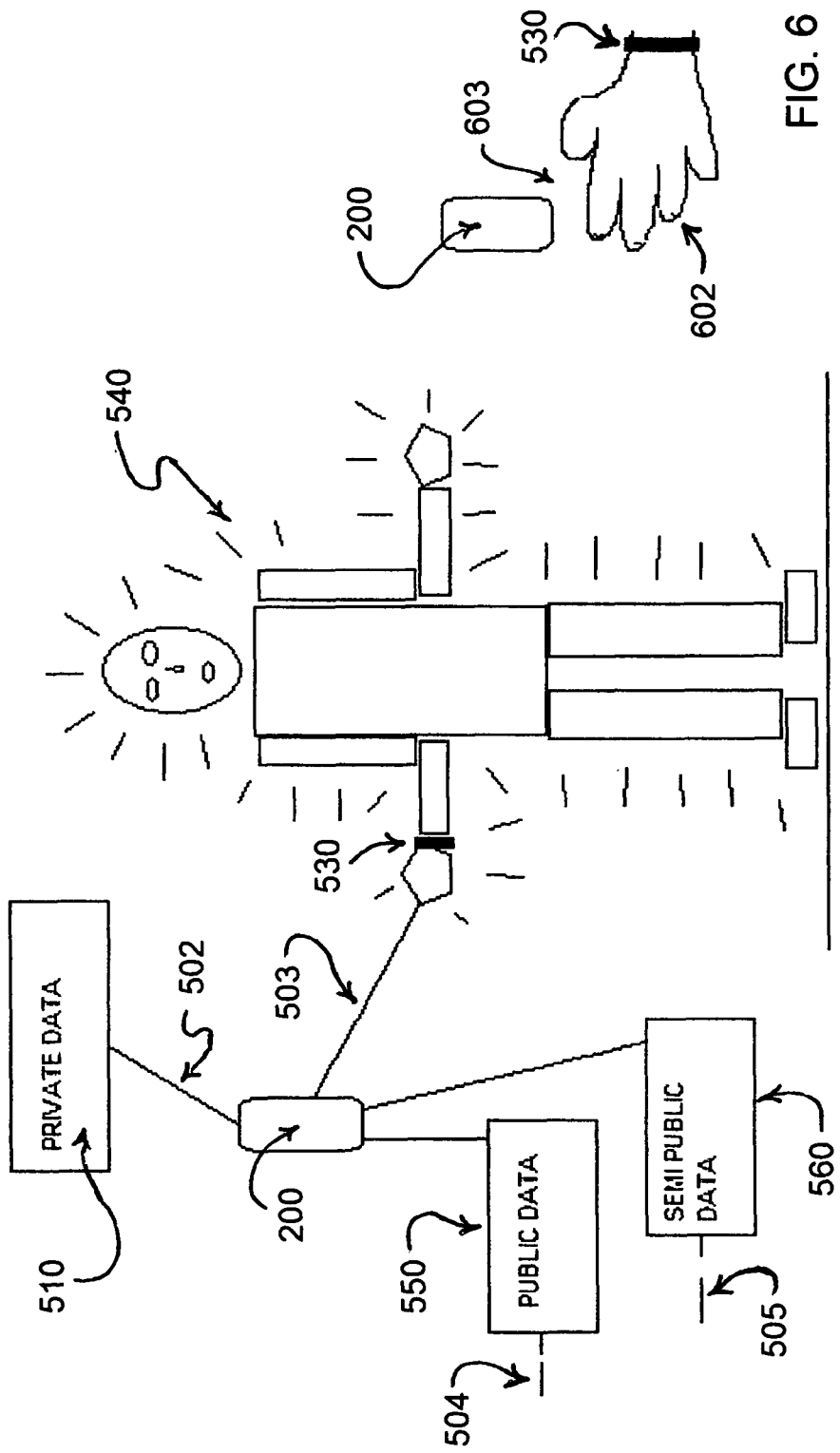
FIG. 5 shows relationship between MIC device, MISK device, host human and bio-data.
FIG. 6 illustrates relationship between MIC device, MISK device and host human.

FIG. 5 is an illustration showing relationship between mobile information cloud device ("MIC") 530, a mobile interactive kiosk device ("MISK") 200 as they relate to a host human and the bio-data 540 for creating a method of forming a completely secure bio-password and/or method of encrypting user information grouped into different levels of privacy such as information for public use 550, semi-public 560 use and private 510 use.

Bio-data 540 may consist of bio-information and bio-characteristics of a human MISK user. An example of some bio-characteristics could be, but are not limited to, a human user's electric field, body capacitance, temperature, voice sound, brain waves, sound of blood flowing, electrostatic charge, one or more electromagnetic frequencies, one or more quasi-electrostatic frequencies, fingerprints, facial characteristics and the like.

Bio-characteristics are generated within or by an individual human body. A human individual's bio-characteristics are as unique to that individual as fingerprints are unique to them. No two humans have exactly the same fingerprints and therefore, that characteristic has become somewhat useful in personal security methods.

The human body has many interesting characteristics that can be used for securing information and other devices. A human body can hold a charge as a capacitor and it can function as an antenna sending and receiving electromagnetic signals. It can be a conductor or function as a dielectric.

MIC device 530 must maintain external or internal contact with a human user and will collect, record and transmit bio-data forming a bio-password unique to the human user. The bio-data gathered by MIC 530 is then transmitted to MISK 200 through communications pathway 503. MISK 200 incorporates digital information passing it through an encryption process that modifies information ("bio-information") based upon bio-data. The newly encrypted information or bio-information is stored on the MISK 200. Individual bio-information can only be decoded through properly paired MISK device 200 that uses the bio-password as a key to decode bio-information into a useable form.

An easy way of encrypting information is by having MISK 200 change information into a broadband frequency, send the broadband transmission through communications pathway 503 into a human user's body where a MIC device 530 in physical contact to the human user receives the signal that has been altered by capacitance characteristics of the human body. The encrypted information can be stored or sent to locations exterior the human body.

Decoding the bio-information requires a difference engine comparing original signal with encrypted signal factoring in human body capacitance occurring at exactly the same time the original signal transmission from MISK 200 began. Information sent into a human body can radiate naturally as part of the human electromagnetic field or be amplified out of the body making various localized communication techniques available.

To secure information into different modes of security, the public information 550 may not involve an encryption method and access to it is through 502. The semi-public data 560 may be encrypted using one set of bio-characteristics thereafter being stored in the MISK 200 and the private data 510 may be protected by another set of bio-characteristics to form absolute security of private information.

No communications link 502 between MISK 200 and private data 510 will be possible without human user first transferring the portion of private data 510 to another lesser security level such as semi-public 560 or public 550 classifications. Only then will other communications devices with to access the bio-information be able to establish a communications pathway 504 or 505 and receive that decodes bio-information back into a useable form devoid of encryption.

This is only one example showing how information can be protected and/or encrypted using a human's bio-characteristics. To someone familiar with the art, a multitude of other protection and/or encryption methods could be provided.

FIG. 6 is an illustration showing relationship between a MIC device 530, a MISK device 200 and a host human 602. The proximate distance between the MIC 530 and the MISK 200 is at 603. MIC 530 is in physical contact with a host human 602.

MIC 530 may be collecting bio-data and transmitting a weak signal into host human body 602 using it as an antenna. MISK 200 can receive the MIC transmission if it is within human body transmission range. However, MISK 200 can send one or more signals to MIC 530 directly and/or into human body 602. In this way a single or multiple signal transmissions of varying frequencies and/or amplitudes can simultaneously be sent and received between MIC 530, MISK 200 and the host human body 602.

FIGS. 7-10 are illustrations showing a few of the many possible methods of human exterior contact with a MIC 700 device. A MIC 700 can make contact on a human ear being attached to a Bluetooth device. Or it can make contact attached to a bracelet 530 of some kind. Eye glasses 810 can make extended contact with a human body as can a wristwatch 820. A MIC 700 can be fastened 901 to adhesive material 900 that can adhere to a human body compatible with human anatomy. FIG. 10 shows a preferred body contact location for a MIC 700. A human forehead would be another preferred body contact location.

Figure 11:
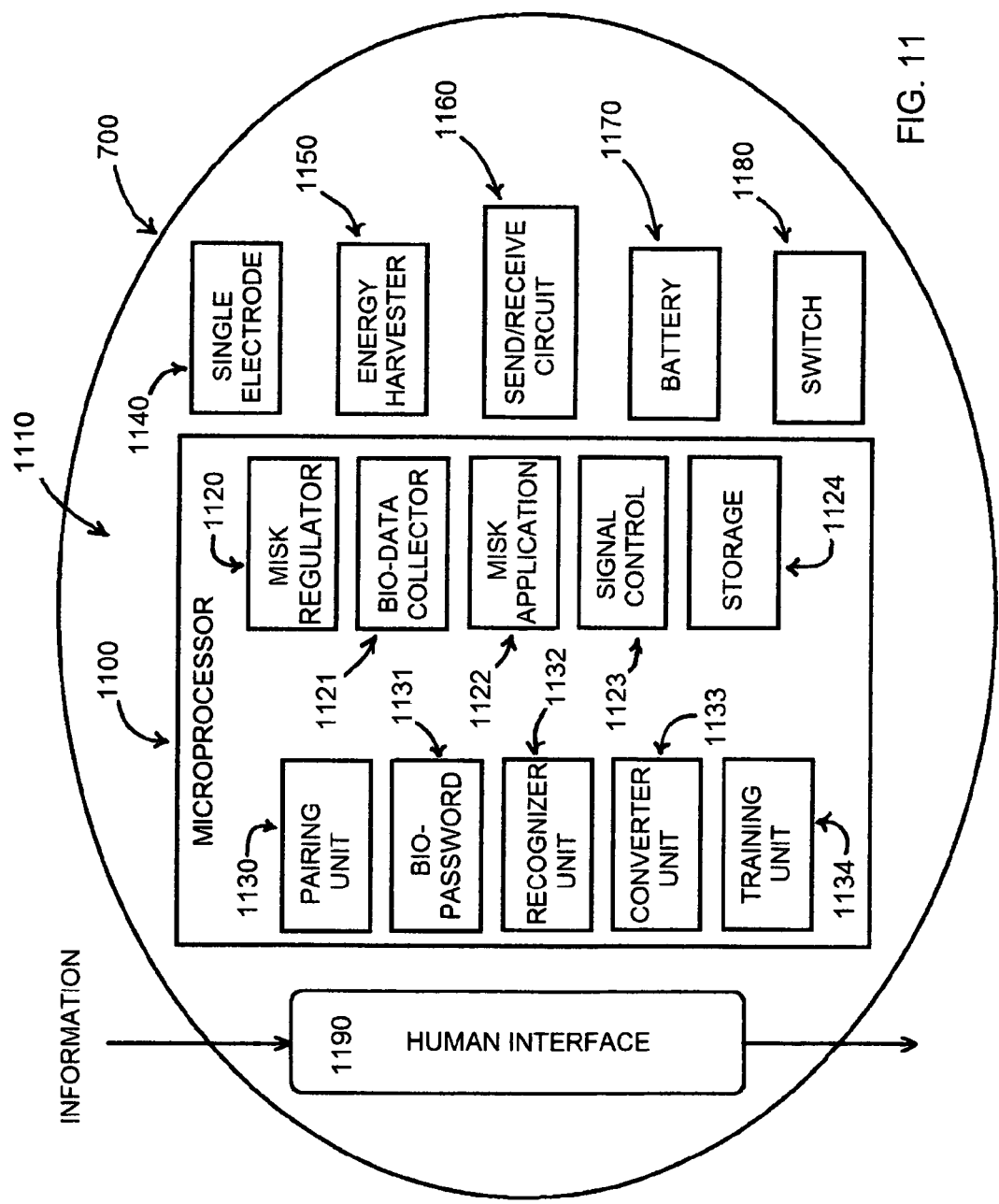
FIG. 11 is an illustration showing a MIC device method.

FIG. 11 is an illustration showing a MIC 700 device method. The present embodiment in part relates to a data communication using a human body as a data transferring medium between human body and/or a MISK 200. In order to collect bio-data from a host human user to be used as a strong security method of protecting information and devices, the MIC 700 must be in physical contact with host human user and consists of a microprocessor 1100 and integrated chip 1110.

The first action of an unpaired MIC 700 is to pair with a human user and a MISK 200 device through a pairing unit 1130. Bio-Data Collector 1121 sends instructions to Energy Harvester 1150 and Human Interface 1190 to gather human bio-characteristics.

Energy Harvester 1190 is a transponder integrated circuit with one or more antennas where one function of at least one antenna is to transform magnetic flux from a magnetic field into an electrical signal having electrical energy. Another aspect of the Energy Harvester 1190 is at least one antenna passively receives electromagnetic signals from human body transmitting it as bio-data to the Bio-Data Collector 1121. Both functions can occur through the same antenna or a plurality of antennas.

A Human Interface 1190 unit consisting of a microphone, thermometer and an electrometer passively collects bio-data and transmits to Bio-Data Collector 1121. Bio-Data Collector 1121 sends one or more aspects of bio-data over to Bio-Password 1131 unit that has instructions for creating one or more bio-passwords. One bio-password might be the sound of blood rushing through human user vessels. One bio-password might utilize electric field of human user. One bio-password might be the electric charge of human user. A bio-password could be the sum total of all bio-data or it could be just a sample of one or more aspects of the bio-data. Whatever the case, the one or more bio-passwords are then stored in 1124 and the bio-data generated is transformed into a signal that the pairing unit 1130 can use to recognize human user.

Once MIC 700 is paired to a human user, it sends bio-password and other bio-data to MISK Regulator 1120 where MISK 200 records bio-password and other bio-data enabling it to pair likewise with human user. MISK Regulator 1120 sends information request to MISK 200 through Send/Receive Circuit 1160 asking for MISK hardware and software identifier information. MISK identifier information is then transmitted back to MIC 700 through Send/Receive Circuit 1160 to MISK Regulator 1120 where MISK identifier information is recorded in Pairing Unit 1130. Through this or similar processes both human user and MISK 200 are uniquely paired with MIC 700.

When other MISK users are proximate to MIC 700 the Recognizer Unit 1133 compares encrypted bio-information pattern from proximate MISK user in order to determine if proximate MISK is properly paired or if it belongs to another human. If proximate MISK belongs to another human, then MISK Regulator 1120 having master/slave control over MISK paired with it, gives permission for MISK to form peer to peer relationship between both MISKs and public information is exchanged.

If a MISK is not properly paired to a human user who is paired with a MIC device or a properly paired MISK is not proximate to the human and MIC it is uniquely paired to, then information exchanges will occur between other proximate communications devices.

MISK Application 1122, in full or in part, may be stored on MIC 700 and be used by MISK Regulator 1120 to transform other proximate communications devices belonging to the human user into a partial or full MISK device.

Information communicated between a MIC and MISK that are paired to each other will flow through the MIC Converter Unit 1133 for implementing data encryption or for de-encrypting information. Data may be encrypted a multitude of possible methods.

An example may be to receive MISK information and average it with bio-information collected. Or information sent from MISK may be sent into human body where signal transmission is altered by human body capacitance.

MIC 700 may detect MISK transmission through Single Electrode 1140. The Signal Control 1123 unit may compare the signal with a clock synthesizer method in order to provide a means of restoring altered signal back to an original form. The clock synthesizer method could use a literal clock mechanism or it could use any one of many regularly occurring frequency transmissions naturally emanating from the human user's body and use the frequency transmissions occurring at the time of transmission as a clock synthesizer method. The natural emanating frequency to be used as a clock synthesizer is recorded from human body at the same time of MIC 700 signal reception from MISK is received. The recorded clock synthesizer frequency emanating from human body at the time of signal reception is recorded and used as the bio-password or decoding key for that information.

In this way every signal transmission will have a bio-characteristic signal associated with it providing an infinite method of information security while at the same time offering a bio-key to unlock bio-encrypted information. Signal Control 1123 chooses how information from its paired MISK will be bio-encrypted. The choice of encryption could be in part modified by a paired human user to offer even more flexibility for security.

The Training Unit 1134 records bio-data collected from MIC 700 and compares them with control human responses. Information may be processed in the training unit 1134 or sent to proximate MISK.

A neural network program will compare complex bio-data signals to control human responses in order to identify brain wave signals associated with human responses.

Games on a MISK may constitute a training session where specific responses to stimuli are known. Bio-data collected from MIC 700 during training sessions will amplify brain wave detection thereby enhancing a communication method that bypasses human sensory organs.

Training Unit 1134 working in tandem with MISK Regulator 1120 can establish a method of ongoing MIC training as human host interacts with other communications devices such as watching TV or playing virtual games on a computer or driving an automobile.

Real time information can be sent from MISK Regulator 1120 to Human Interface 1190 which can be discerned by human host in a method that bypasses sensory organs and/or MISK Regulator 1120 can relay display information through Send/Receive Unit 1160 that will transmit a signal outside the body to MISK 200 where training information can be displayed in human readable form using human sensory organs.

Signals can be transmitted to the human host from MIC 700 as a modulating current through Single Electrode 1140 and/or as a frequency of any modulation (or lack thereof), wavelength, kind, type, charge, amplitude or intensity sent by Send/Receive Unit 1160 in a form discernable to host human brain directly having bypassed human sensory organs.

Energy Harvester 1160 unit can reduce the size of battery 1170 needed while at the same time offers an ability of recharging which provides capability of subcutaneous human contact with MIC 700.

Figure 12:
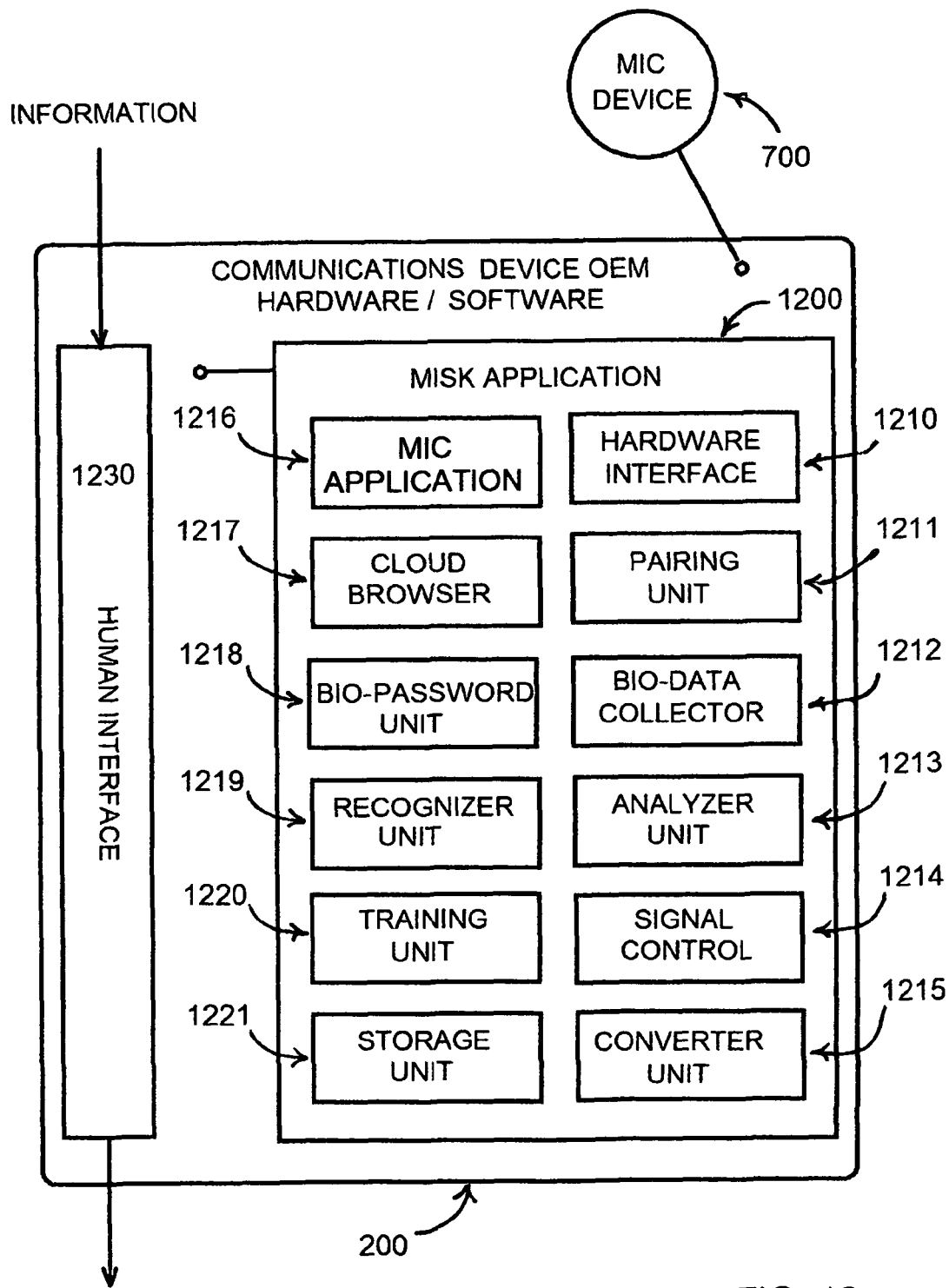
FIG. 12 is a diagram showing MISK device method.

FIG. 12 is a diagram showing mobile interactive kiosk method. Although a MISK 200 device could be made complete and ready to go direct from the factory, the present embodiment relates to a communications device, such as a cell phone, being transformed into a MISK 200 device once becoming proximate to another properly paired MISK or a properly paired MIC 700 device.

Once the MISK Application 1200 is installed on the cell phone through its OEM hardware and/or software, the device is a MISK 200. The newly activated MISK 200 then activates the Pairing Unit 1211 coordinating pairing functions between a MIC 700 in physical contact with a human host through the MIC Application 1216 which acts as master over MISK Application 1200 instructing Pairing Unit 1211 to receive MIC 700 bio-password through Hardware Interface 1210.

Bio-password from MIC 700 is stored in Storage Unit 1221 and is used by Recognizer Unit 1219 as a method of pairing with host human user. Recognizer Unit 1219 then requests hardware and software identifier information from MIC 700 through Hardware Interface 1210 that is further stored in Storage Unit 1221 and are subsequently used to identify MIC 700 whenever it is proximate to MISK 200.

Host human user can instruct MISK 200 through key pad, touch screen, voice commands or by optical methods through Human Interface 1230 to MISK Application 1200 via Hardware Interface 1210. Instructions may activate Cloud Browser 1217 which opens a cloud browser application on MISK 200 displaying content in human readable form. Cloud Browser 1217 may simultaneously connect with the Internet or other network according to host human instructions communicated through Human Interface 1230.

MISK 200 will also collect bio-data obtained through Hardware Interface 1210. Bio-Data Collector 1212 gathers and sends one or more aspects of bio-data over to Bio-Password 1218 unit that has instructions for creating one or more bio-passwords.

One bio-password might be the sound of the host human's voice. One bio-password might utilize exterior electric field of human user. One bio-password might be a fingerprint of human user. A bio-password could be the sum total of all bio-data or it could be just a sample of one or more aspects of the bio-data. Whatever the case, one or more bio-passwords are then stored in 1221 and the bio-data generated is transformed into a modulating and/or non-modulating signal that the pairing unit 1211 can use to recognize human user.

Once MISK 200 is paired to a human user, it sends bio-password and other bio-data collected by MISK 200 to MIC 700. At the same time Bio-Data Collector 1212 records bio-data generated from MIC 700 enabling MISK 200 to pair with human user and corresponding MIC 700. MIC Application 1216 sends information request through Hardware Interface 1210 to MIC 700 asking for MIC hardware and software identifier information. MIC identifier information is then transmitted back to MISK 200 through Hardware Interface 1210 to MIC Application 1216 where MIC identifier information is recorded in Pairing Unit 1211. Through this or similar processes both human user and MISK 200 are uniquely paired with MIC 700.

When other MISK users are proximate to MISK 200 the Recognizer Unit 1219 compares encrypted bio-information pattern from proximate MISK user in order to determine if proximate MISK is properly paired or if it belongs to another human.

If proximate MISK belongs to another human, then MIC Application 1216 having master/slave control over MISK 200 paired with it, gives permission for both MISKs to form peer to peer relationship and a communications pathway is established and public information exchanged between them.

If a MISK is not properly paired to a human user who is paired with a MIC device or a properly paired MISK is not proximate to the human and MIC it is uniquely paired to, then information exchanges will not occur between other proximate communications devices.

MISK Application 1200, in full or in part, may be stored on MIC 700 and be used by MIC application 1216 to transform other proximate communications devices belonging to the human user into a partial or full MISK device.

Information communicated between a MIC and MISK that are paired to each other will flow through the Converter Unit 1215 for implementing data encryption or for de-encrypting information.

Data may be encrypted a multitude of possible methods. An example may be to receive MIC information and average it with bio-information collected at 1212. Or information received into MISK 200 may be sent as a modulating and/or non-modulating signal transmission into host human body where signal transmission is altered by human body capacitance. MIC 700 may detect MISK 200 and resend altered signal back to MISK 200.

The Signal Control 1214 unit may compare the signal with a clock synthesizer method in order to provide a means of restoring altered signal back to an original form. The clock synthesizer method could use a literal clock mechanism or it could use any one of many regularly occurring frequency transmissions naturally emanating from the human user's body. Those frequency transmissions occurring at the time of transmission could serve as a clock synthesizer method of encryption.

The natural emanating frequency to be used in the clock synthesizer is recorded from human body at the same time of MISK 200 signal transmission from MISK is sent. The recorded clock synthesizer frequency emanating from human body at the time of signal transmission is recorded and used as the bio-password or decoding key for that information.

In this way every signal transmission can have one or more bio-characteristics signal associated with it providing an infinite method of information security while at the same time offering a bio-key to privately unlock bio-encrypted information.

Signal Control 1214 chooses how information from its paired MIC will be bio-encrypted. The choice of encryption could be in part modified by a paired human user to offer even more flexibility for security.

The Training Unit 1220 records bio-data collected from MISK 200 and/or MIC 700 and compares them with control human responses. Bio-data can be any form of a human characteristics such as but not limited to electromagnetic, heat, capacitance sound and optical. Information may be processed in the training unit 1220 or sent to a proximate MISK or a server having a communications pathway with MISK 200.

A neural network program or similar application, capable of understanding complex information, operating inside of or through Analyzer Unit 1213 can compare complex bio-data signals to control human responses in order to identify brain wave signals associated with human responses.

Games on MISK 200 may constitute a training session where specific responses to stimuli are known. Bio-data collected from MISK 200 and/or MIC 700 during training sessions will amplify brain wave detection capabilities thereby enhancing a communication method that bypasses human sensory organs.

Training Unit 1220 working in tandem with MIC Application 1216 can establish a method of ongoing MISK training as human host interacts with other communications devices such as watching TV or playing virtual games on a computer or driving an automobile.

Real time information can be sent from MIC Application 1216 to Human Interface 1230 which can be discerned by human host in a method that bypasses sensory organs and/or MIC Application 1216 can relay display information through Human Interface 1230 that will display information in human readable form discernable to human sensory organs.

Signals can be transmitted to the human host from MISK 200 as a non-modulated wave form and/or a modulated wave form sent by Send/Receive Unit 1160 in a wave configuration discernable to host human brain directly having bypassed human sensory organs.

Figure 13:
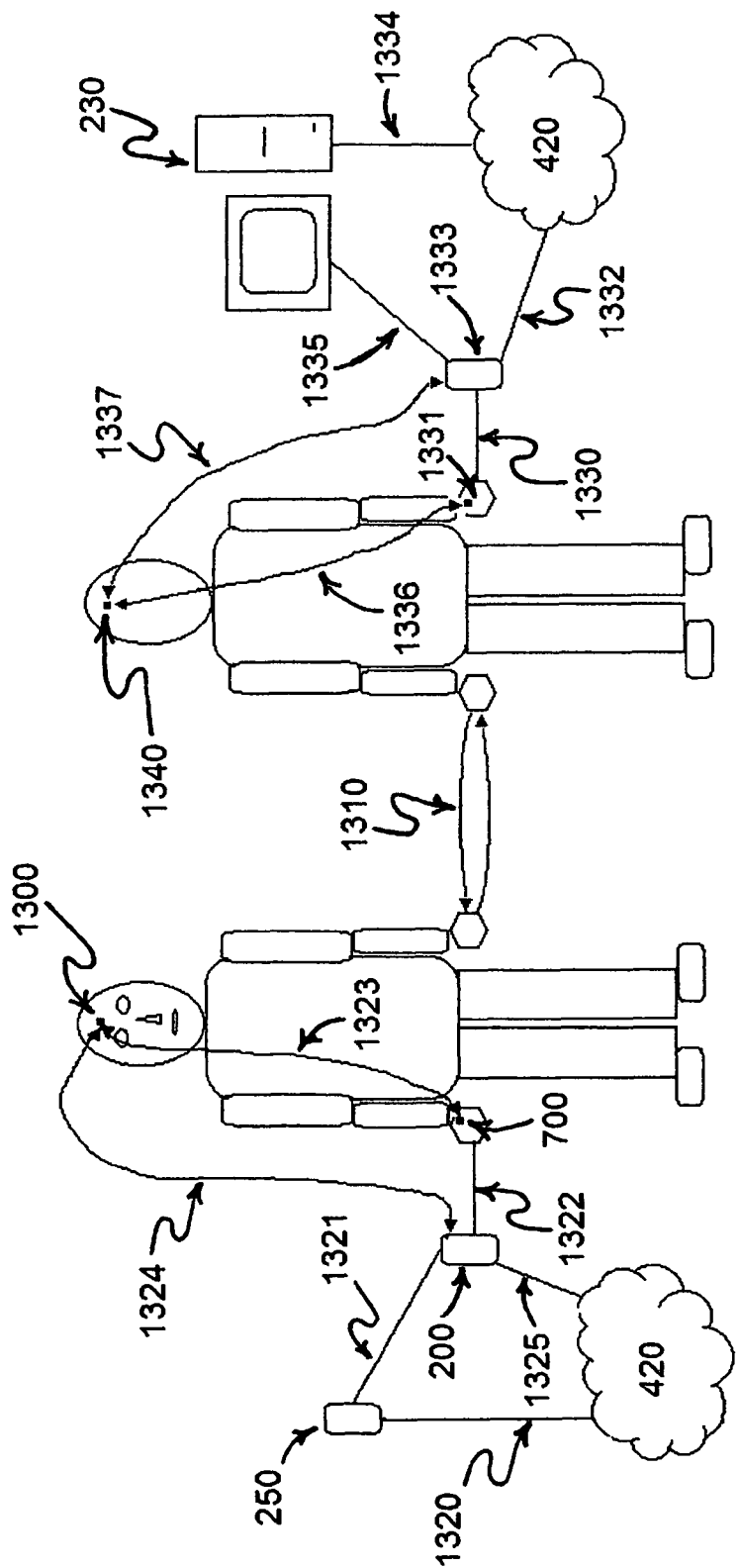
FIG. 13 illustrates relationship between multiple human users of the present invention.

FIG. 13 is an illustration describing communication method between multiple human users of the present invention. Human 1300 is proximate to human 1340 of distance 1310 where body to body communications can occur. Information stored in MIC 700 on in contact with human 1300 is communicated to MIC 1331 that is in physical contact with human 1340.

Information stored on MIC 700 and MIC 1331 pertains to personal identifier information for each human consisting of name, address, phone number, medical records, financial records and whatever other information needed to promote the health and well being of each human. Information exchanged will be determined by setting different levels of classifications for personal information that may include a public classification, semi-public classification and a private classification.

An example of public information might consist of name and social media address. Semi-public information may include phone number, email address, mailing address and the like. Private information may include financial records, medical records, banking information, credit card information, confidential records and the like.

If human 1300 was in physical contact with a medical doctor or emergency medical technician through contact point 1310, due to the physical location of the medical facility or the professional classification of the emergency medical technician, information classification groupings can temporarily be adjusted in a manner consistent with commonly accepted information exchanges occurring at that location in the real world apart of MISK information exchanges.

If the information requested exceeds what MIC 700 has stored, additional personal information can come through MISK 200 through communications pathway 1322 using human body 1300 as a medium whereby emergency medical technician's human body 1340 is a medium receiving information from contact point 1310 passing through human body 1340 to MIC 1331 which is transmitted to MISK 1333 and displayed in human readable form. Medical information could further be relayed from MISK 1333 to a server 230 location offsite through communications pathway 1332 to Cloud Browser application 110 through communications pathway 1334. Or Medical information could be sent directly to proximate computer 230 acting as a temporary server through communications pathway 1335.

As brain wave patterns are trained into MISK 200 and MIC 700 a communications pathway is established at 1324 between MISK 200 and human brain 1300. A communications pathway is further established at 1323 between MIC 700 and human brain 1300 where signal transmissions from MIC 700 and MISK 200 can enter directly into human brain 1300 through pituitary or brain directly through human nervous system.

Human 1300 can thus send and receive communications using synthetic telepathy methods. Signal methods of transmission into human body 1300 may be modulating or non-modulating, electromagnetic, electrostatic, quasi-electrostatic or electric current transmission. Any form of signal type, frequency, amplitude, charge or intensity can be used either to communicate directly with human brain 1300 or to encrypt information passing through MISK 200, MIC 700 or human body 1300.

Figure 14:
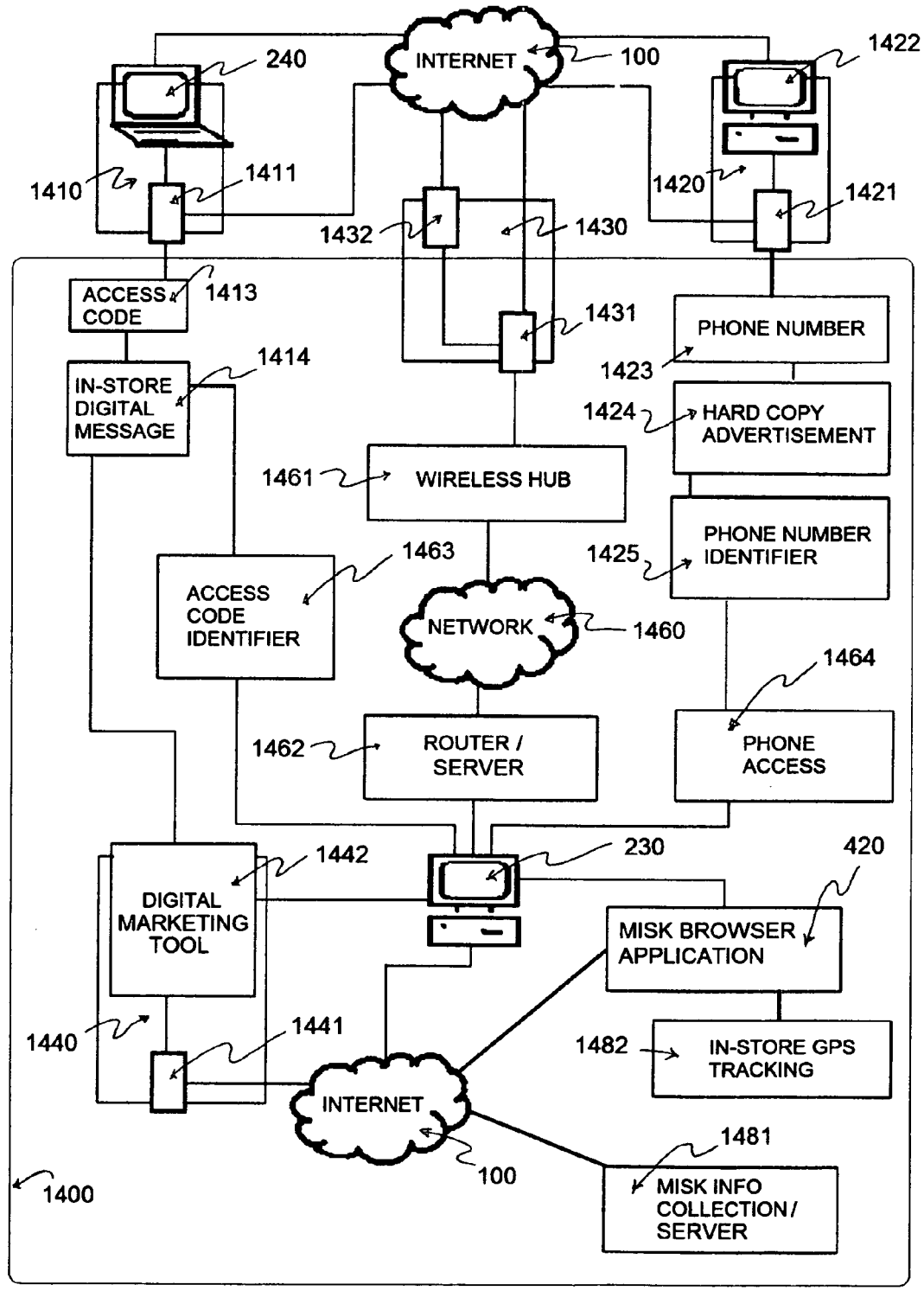
FIG. 14 illustrates certain data flows associated with a MISK communications device and a commercial entity.

FIG. 14 illustrates certain data flows associated with a MISK communications device within a commercial entity. Physical store location 1400 has a desktop computer 230 with MISK application 420 installed therein transforming it into a partial MISK device. A local area network ("LAN") 1460 is established through router 1462 emanating from Wireless Hub 1461. Cell phone 1431 is within the store as is cell phone 1441. Cell phones 1411 and 1421 are not inside physical store location.

The first time cell phone 1431 enters store 1400 a communications pathway is established to store desktop computer 230 through wireless hub 1461 which is connected to LAN network 1460 through router 1462. MISK browser application 420 prompts cell phone 1431 forming a communications link enabling MISK browser application to display message in human readable form upon cell phone providing opportunity to accept loading MISK browser application 420 upon cell phone 1431. MISK application 420 is then able to prompt cell phone 1432 that is either in proximate range 1430 of cell phone 1431 or in phone contact, text contact or email contact.

MISK application 420 identifies cell phone hardware and software recording that information in server 1462 and/or MISK info collection server 1481. In store tracking data collected from cell phone 1431 shopping activities is also stored in servers 1462 and 1481.

Examples of in store data to be collected might consist of GPS coordinates throughout the store showing customer traffic patterns. Store data collected might also contain products purchased, digital advertising interactions, interactions with store services and personnel. The possibilities are endless and can be tailored to fit the marketing needs of each specific commercial enterprise.

Cell phone 1421 is walking through the mall and sees a hard copy advertisement 1424 offering a special phone number 1423 that connects cell phone 1421 directly to store desk top computer 230 through phone identifier 1425 and 1464 respectfully. MISK application 420 offers cell phone 1421 user opportunity, displayed in human readable form, to accept MISK installation. Acceptance may be verbally initiated, initiated through touch pad or key pads. MISK application 420 records cell phone 1421 hardware and software identifier information and stores collected data on servers 1481 and/or 1462.

Cell phone 1421 then goes into another store proximate to desktop computer 1422 whereby MISK application provides opportunity displayed in human readable form for desktop user 1422 to accept MISK installation. Upon acceptance store 1422 can participate in all store tracking applications and methods store 1400 is using as provided through MISK application 420.

Cell phone 1411 sees a digital advertisement 1414 having access code 1413 options being displayed. Examples of advertising might offer a code for one product or service and another code for another product or service. The code for the first offering might be the number 1 and concurrently the second offering might have a code number 2. User of cell phone 1411 may physically enter number 1 or number 2 which will open up advertising information relative to the product or service of interest.

Advertising information may be displayed in human readable form upon digital message medium 1414 and/or upon cell phone 1411 screen. Other codes offering other products or services may be provided turning user cell phone 1411 into a mobile interactive kiosk. Information can be collected through cell phone 1411 for the user's benefit and/or information can be collected about user for the store's benefit.

Customer information gathered in this way will be sent to digital marketing tool 1442 that provides opportunity for store marketing personnel to instantly update and track advertising methods and campaigns. How a product performs or how a customer interacts with a product, advertisement or how the customer uses the store facility is useful data. The MISK application 420 will gather and refer data to digital marketing tool 1442 providing continual, instant and real time customer feedback to store marketing department personnel.

The present embodiment further provides a method of categorizing business to customer information exchanges within a cloud environment based upon a business location and the rules governing information exchanges in the real world at that location. As each store accepts installation of MISK application 420, the new MISK user will set information exchange security protocol for that location by entering into the MISK application the business': physical address, company name, contact name, phone number, email address, web page address, and financial information it would generally share with customers and other businesses.

Additionally MISK settings will delineate what kind of information is typically exchanged publically between the business and a customer; what kind of information is exchanged in a semi-public encounter; and what information is to be private to that business in normal client interactions.

The contact person's bio-data will be used to configure and encrypt the information differently for all three information groups ensuring information exchanges and financial transactions occurring at the business location will be totally secure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An information exchange system, comprising:
   a user bio-characteristic module for an electronic device to identify a unique user;
   a range selector, for determining a physical range in which to broadcast information, receive information or both, sufficient to form an information cloud;
   one or more information filters; and
   one or more privacy filters, to control the target or source of information broadcast or received.

2. The information exchange system of claim 1, wherein the information clouds comprise mobile information clouds and stationary information clouds.

3. The information exchange system of claim 2, further comprising an intersection of two or more clouds where information is exchanged in an intersection zone.

4. The information exchange system of 2, wherein a stationary cloud is in proximity to one or more of a retail store, bank, church and service business.

5. The information exchange system of claim 1, wherein the electronic devices comprises one or more of a cellular phone, tablet computer, laptop computer and desktop computer.

6. The information exchange system of claim 1, wherein at least one device is electronically paired to a user.

7. The information exchange system of claim 6, wherein pairing comprises utilizing at least one of the one or more bio-characteristics of a user.

8. The information exchange system of claim 7, wherein the at least one bio-characteristic of a user is measured by a communications device in contact with the user.

9. The information exchange system of claim 1, wherein information comprises one or more of identification information, location, photographs, music, video, financial information, retail promotions and personal or business account or status information.

10. The information exchange system of claim 1, wherein the physical range comprises about three miles.

11. The information exchange system of claim 1, wherein the physical range comprises one or more of about five miles, about two miles, about one mile, about one thousand yards, about one hundred yards, about ten yards, about ten feet, about three feet and immediate proximity.

12. The information exchange system of claim 1, wherein the information is collected in one or more databases.

13. The information exchange system of claim 2, wherein at least a portion of the information exchanged can be deleted once contact between clouds is removed.

14. The information exchange system of claim 1, wherein privacy filters comprises one or more of a friends list, direct names list, and local rules list for selecting potential information exchange targets and determining level of information exchanges, information access and information storage.

15. A method of exchanging information using an electronic device, comprising:
   identifying a unique user of portable electronic device by one or more bio-characteristics of the user;
   selecting a range for broadcasting and receiving information with the electronic device;
   selecting one or more information filters;
   selecting one or more privacy filters;
   broadcasting user information within the selected range; and
   receiving filtered information with the selected range.

16. The method of claim 15, wherein information comprises one or more of identification information, location, photographs, music, video, financial information, retail promotions and personal or business account or status information.

17. The method of claim 15, wherein the range comprises about three miles.

18. The method of claim 15, wherein the range comprises one or more of about five miles, about two miles, about one mile, about one thousand yards, about one hundred yards, about ten yards, about ten feet, about three feet and immediate proximity.

19. The method of claim 15, wherein privacy filters comprises one or more of a friends list, direct names list, and local rules list for selecting potential information exchange targets and determining level of information exchanges, information access and information storage.

* * * * *